UNITED STATES PATENT OFFICE.

OGDEN BOLTON, JR., AND JOHN PEDDER, OF PITTSBURG, PENNSYLVANIA.

IMPROVEMENT IN MANUFACTURING IRON AND STEEL.

Specification forming part of Letters Patent No. 135,512, dated February 4, 1873.

*To all whom it may concern:*

Be it known that we, OGDEN BOLTON, Jr., and JOHN PEDDER, of Pittsburg, county of Allegheny and State of Pennsylvania, have invented certain new and useful Improvements in the Manufacture of Iron or Steel, of which the following is a specification:

The nature of our invention consists in placing the ore which is to be worked into iron or steel in molds or tubes, which are partially closed so as to protect the ore from the air, and subjecting the molds or tubes to heat in a furnace until the ore is reduced, or partially so, when they are charged into the steel melting or puddling furnace, or passed directly under the hammer or in between rollers, and made into blooms without the ore having come into contact with the air.

We take iron ore or the oxide of iron which is to be manufactured into iron or steel, in preferably a crushed condition, and mix it with rather more than the theoretical amount of carbonaceous matter, such as charcoal, coke, or coal, necessary to combine with the oxygen of the oxide of iron, and in cases where the ore contains much silica we add a small amount of lime. This mixture we insert into tubes or molds of any shape or size, and of any desired material, and close them so as to leave only a small opening for escape of the gas produced by the combination of the carbon with the oxygen of the oxide of iron. These tubes or molds are then placed in any furnace, and kept at a red or greater heat till the ore is reduced, or partially so, to metallic iron, when they are ready to be charged into a steel melting or puddling furnace.

When it is desired to make the ore directly into blooms it is only necessary to raise the temperature of the tubes or molds after the ore has been nearly or wholly reduced, which may be done either in the same furnace where the ore has been reduced or in any other.

After the tubes or molds have been raised to a welding heat they are placed under a hammer or passed between rolls or squeezers and made into blooms without the ore having come once into contact with the air.

In addition to the oxide of iron all sorts of scraps of iron, wrought-iron, and steel may be mixed in the mold or tube before charging it into the furnace.

When finely-divided particles of iron are heated and exposed to the air they become oxidized very rapidly, and it is to prevent this that we inclose the ore in cases to protect it.

Having thus described our invention, what we claim as new, and desire to secure by Letters Patent of the United States, is—

The method herein described of manufacturing iron or steel direct from the ore by the inclosure of the component parts in molds or tubes, submitting the same to the proper heat and "working up" the molds or tubes with the metal, thus preventing oxidation by protecting the metal from contact with the air, substantially as specified.

In testimony that we claim the foregoing as our invention we hereunto affix our signatures this 18th day of December, 1872.

OGDEN BOLTON, JR.
    JOHN PEDDER.

Witnesses:
 C. N. BURTT,
 ALEXANDER SCOTT.